(12) United States Patent
Krahn (10) Patent No.: US 9,920,776 B2
(45) Date of Patent: Mar. 20, 2018

(54) FLUID CONTROLLER WITH LOAD SENSE AND FLOW AMPLIFICATION

(71) Applicant: Eaton Corporation, Cleveland, OH (US)

(72) Inventor: Aaron Kelly Krahn, Eden Prairie, MN (US)

(73) Assignee: EATON CORPORATION, Cleveland, OH (US)

(*) Notice: Subject to any disclaimer, the term of this patent is extended or adjusted under 35 U.S.C. 154(b) by 625 days.

(21) Appl. No.: 14/306,657

(22) Filed: Jun. 17, 2014

(65) Prior Publication Data

US 2014/0366520 A1 Dec. 18, 2014

Related U.S. Application Data

(60) Provisional application No. 61/836,202, filed on Jun. 18, 2013.

(51) Int. Cl.
*B62D 5/09* (2006.01)
*F15B 13/04* (2006.01)
*B62D 5/097* (2006.01)

(52) U.S. Cl.
CPC .......... *F15B 13/0402* (2013.01); *B62D 5/097* (2013.01); *Y10T 137/8659* (2015.04)

(58) Field of Classification Search
CPC .......... B62D 5/093; B62D 5/09; B62D 5/097; B62D 5/083; Y10T 137/8659; F15B 13/0402
See application file for complete search history.

(56) References Cited

U.S. PATENT DOCUMENTS

| 4,033,377 A | 7/1977 | Johnson |
| 4,640,094 A | 2/1987 | Wittren |
| 4,730,544 A * | 3/1988 | Jorgensen .............. B62D 5/083 137/625.24 |

(Continued)

FOREIGN PATENT DOCUMENTS

EP 0775623 5/1997

OTHER PUBLICATIONS

Bae, Geun Tae, International Search Report and Written Opinion, dated Oct. 27, 2014, 15 pages.

*Primary Examiner* — F. Daniel Lopez
*Assistant Examiner* — Abiy Teka
(74) *Attorney, Agent, or Firm* — Jarett D. Millar (57) ABSTRACT

A fluid controller includes a valve housing having an inlet port, a return port, first and second control ports and a load sense port. The fluid controller further includes a fluid meter in selective fluid communication with the valve housing and a valve assembly adapted to provide selective fluid communication between the valve housing and the fluid meter. The valve housing includes a main flow path and a load sense flow path. The main flow path is adapted to provide selective fluid communication between the inlet port and the first control port. Fluid in the main flow path passes through the fluid meter. The load sense path is adapted to provide selective fluid communication between the load sense port and the main flow path. The load sense flow path includes a variable load sense orifice that substantially closes prior to a maximum rotational displacement of the valve assembly.

14 Claims, 9 Drawing Sheets

(56) References Cited

U.S. PATENT DOCUMENTS 5,819,532 A * 10/1998 Wang .................... B62D 5/09
                                                                                                 60/384
6,213,247 B1    4/2001  Rom et al.
7,028,469 B2 * 4/2006 Porskrog ............. F15B 19/002
                                                                                               60/384

* cited by examiner

FLUID CONTROLLER WITH LOAD SENSE AND FLOW AMPLIFICATION

CROSS-REFERENCE TO RELATED APPLICATION

This application claims the benefit of U.S. Provisional Patent Application Ser. No. 61/836,202, entitled "Fluid Controller with Load Sense and Flow Amplification" and filed Jun. 18, 2013, which application is hereby incorporated by reference in its entirety.

BACKGROUND

Fluid controllers are used in many applications to control the flow of fluid from a source of pressurized fluid, such as a vehicle pump, to a fluid pressure operated device, such as a vehicle steering cylinder. Many applications use fluid controllers that have load sense circuits and flow amplification. In fluid controllers with flow amplification and manual steering capability, the flow amplification peaks at roughly 50 to 60 rpm and then begins to decline as the steering speed increases. However, in some applications, this is not desirable since the operator expects more responsive steering at faster steering speeds.

SUMMARY

An aspect of the present disclosure relates to a fluid controller. The fluid controller includes a valve housing having an inlet port, a return port, first and second control ports and a load sense port. The fluid controller further includes a fluid meter in selective fluid communication with the valve housing and a valve assembly adapted to provide selective fluid communication between the valve housing and the fluid meter. The valve housing includes a main flow path and a load sense flow path. The main flow path is adapted to provide selective fluid communication between the inlet port and the first control port. Fluid in the main flow path passes through the fluid meter. The load sense path is adapted to provide selective fluid communication between the load sense port and the main flow path. The load sense flow path includes a variable load sense orifice that substantially closes prior to a maximum rotational displacement of the valve assembly.

Another aspect of the present disclosure relates to a steering circuit. The steering circuit includes a fluid pump, a priority valve assembly in fluid communication with the fluid pump, a fluid actuator in selective fluid communication with the fluid pump, and a fluid controller in fluid communication with the fluid actuator and the priority valve. The fluid controller includes a valve assembly having a main flow path, an amplification flow path, and a load sense flow path. The main flow path is adapted to provide selective fluid communication between the fluid pump and the fluid actuator. The amplification flow path is in parallel to the main flow path. The amplification flow path is adapted to provide selective fluid communication between the fluid pump and the fluid actuator. The load sense flow path is adapted to provide selective fluid communication between the priority valve assembly and the main flow path. The load sense flow path includes a variable load sense orifice that substantially closes prior to a maximum rotational deflection of the valve assembly.

Another aspect of the present disclosure relates to a steering circuit. The steering circuit includes a priority valve assembly including a load sense orifice. A fluid controller is in fluid communication with the priority valve assembly. The fluid controller includes a valve housing defining an inlet port, a return port, first and second control ports and a load sense port. A fluid meter is in selective fluid communication with the valve housing. A valve assembly is adapted to provide selective fluid communication between the valve housing and the fluid meter. The valve assembly includes a main flow path and a load sense flow path. The main flow path is adapted to provide selective fluid communication between the inlet port and the first control port. The main flow path includes a first variable orifice disposed between the inlet port and the fluid meter. The load sense flow path is adapted to provide selective fluid communication between the load sense port and the main flow path. The load sense flow path includes a variable load sense orifice having a variable orifice area that reduces during deflection of the valve assembly so that a fluid pressure across the first variable orifice increases.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
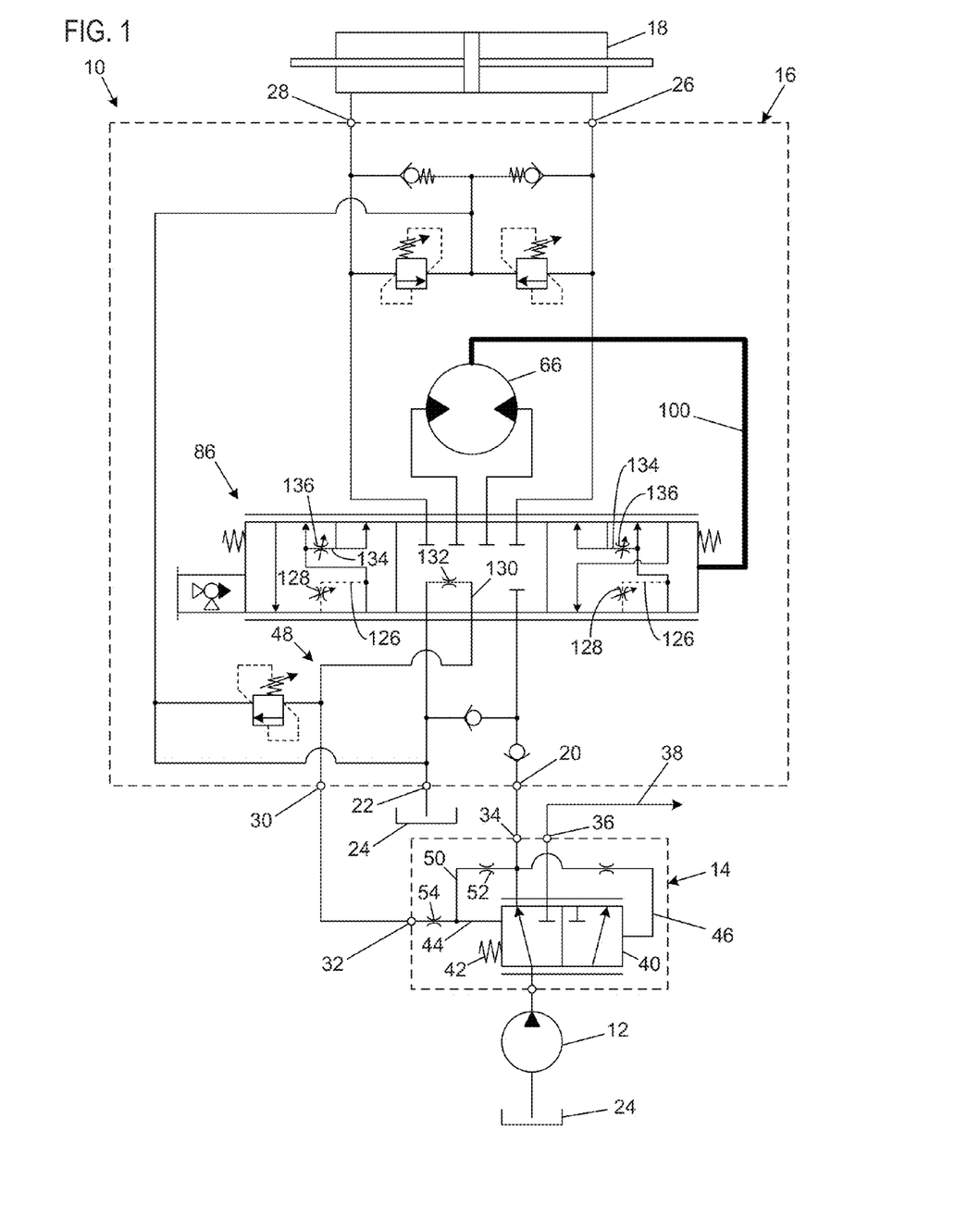
FIG. 1 is a schematic representation of a steering circuit having exemplary features of aspects in accordance with the principles of the present disclosure.

Referring now to FIG. 1, a steering circuit 10 is shown. The steering circuit 10 includes a fluid pump 12, a priority valve assembly 14 in fluid communication with the fluid pump 12, a fluid controller 16 in fluid communication with the priority valve assembly 14 and a fluid actuator 18 in fluid communication with the fluid controller 16. In the depicted embodiment, the fluid actuator 18 is a linear actuator.

The fluid controller 16 includes an inlet port 20 that is in fluid communication with the priority valve assembly 14, a return port 22 in fluid communication with a fluid reservoir 24, and first and second control ports 26, 28 in fluid communication with the fluid actuator 18. The fluid controller 16 further includes a load sense port 30. The load sense port 30 is in fluid communication with a signal port 32 of the priority valve assembly 14.

The priority valve assembly 14 includes a first outlet port 34 and a second outlet port 36. The first outlet port 34 is in fluid communication with the inlet port 20 of the fluid controller 16. The second outlet port 36 is in fluid communication with an auxiliary circuit 38.

The priority valve assembly 14 includes a valve spool 40 that is biased by a spring 42 to a position in which substantially all of the fluid from the fluid pump 12 is routed to the first outlet port 34. The spring 42 is aided by a signal line 44 that is in fluid communication with the signal port 32 of the priority valve assembly 14. In opposition to these biasing forces is the pressure exerted on the spool 40 by a pilot signal 46 that is in fluid communication with the first outlet port 34 of the priority valve assembly 14.

In the depicted embodiment, the steering circuit 10 includes a load sense circuit 48. In the depicted embodiment, the load sense circuit 48 provides a "dynamic" load signal in which there is actual flow through the load sense lines rather than a "static" load signal in which there is no flow through the load sense lines except during transient conditions.

The load sense circuit 48 includes a flow path 50 that provides fluid communication between the first outlet port 34 and the signal line 44. The flow path 50 allows fluid to flow from the first outlet port 34 into the signal line 44. The flow path 50 includes a dynamic signal orifice 52 that limits the flow into the signal line 44. The signal line 44 includes a load sense orifice 54. In the depicted embodiment, the load sense orifice 54 is a fixed orifice having a fixed orifice area. The pilot line 46 includes a damping orifice 56 that dampens the variations in the pressure signal acting on the spool 40.

Figure 2:
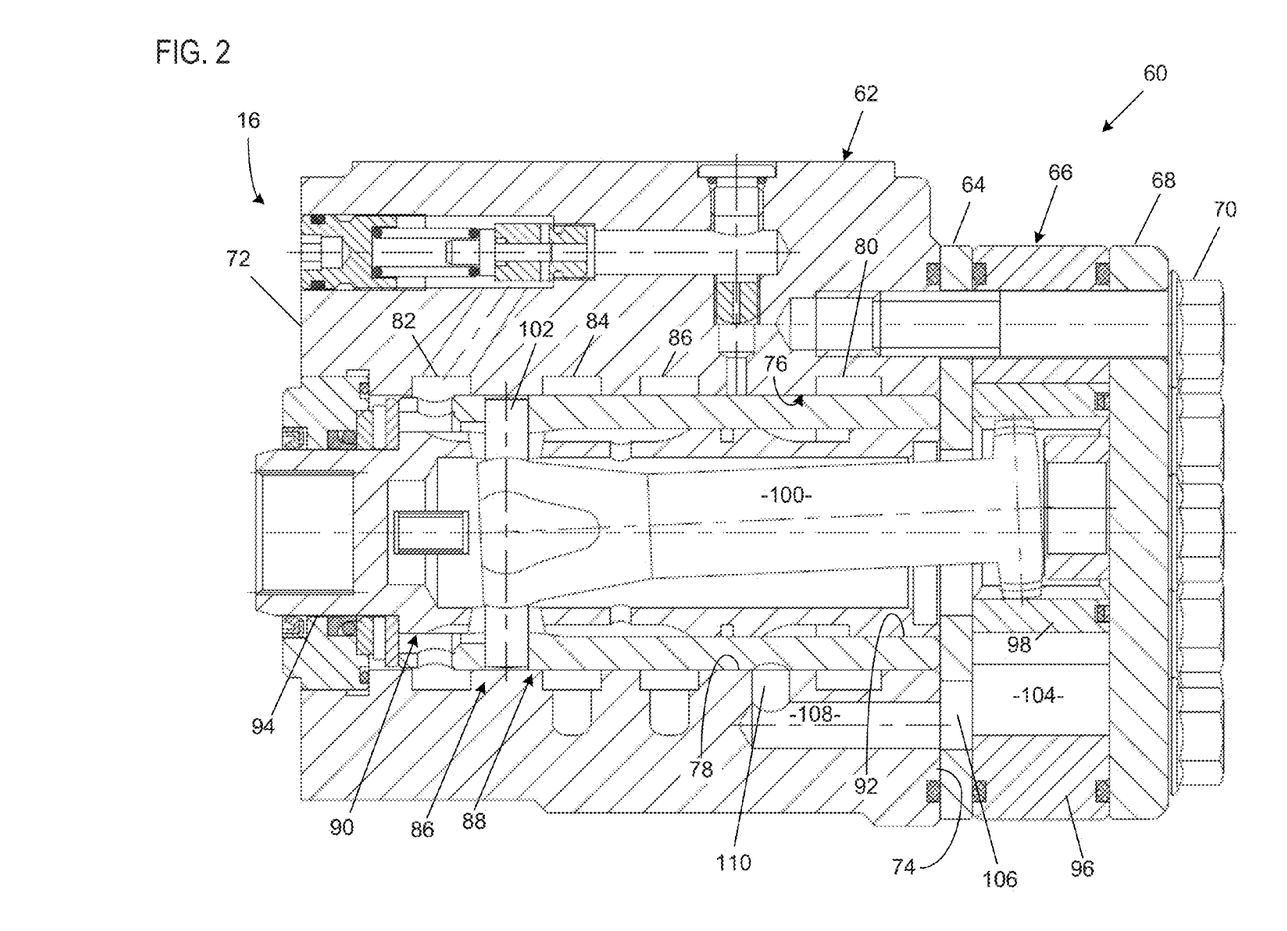
FIG. 2 is a cross-sectional view of a fluid controller suitable for use with the steering circuit of FIG. 1.

Referring now to FIGS. 1 and 2, the fluid controller 16 will be described. The fluid controller 16 includes a body 60. In the depicted embodiment, the body 60 of the fluid controller 16 includes a plurality of sections. In the depicted embodiment, the body 60 includes a valve housing 62, a port plate 64 disposed adjacent to the valve housing 62, a fluid meter 66 disposed adjacent to the port plate 64 and an end cap 68 disposed adjacent to the fluid meter 66. The sections are held together by a plurality of fasteners 70 (e.g., bolts, etc.). In the depicted embodiment, the fasteners 70 are threadedly engaged with the valve housing 62.

The valve housing 62 includes a first end 72 and an oppositely disposed second end 74. The valve housing 62 includes an inner surface 76 that defines a valve bore 78. The valve bore 78 extends through the first and second ends 72, 74 of the valve housing 62.

The inner surface 76 of the valve housing 62 further defines inlet and outlet annular grooves 80, 82 having openings at the valve bore 78. The inlet annular groove 80 is disposed adjacent to the second end 74 of the valve housing 62 while the outlet annular groove 82 is disposed adjacent to the first end 72. The inlet annular groove 80 is in fluid communication with the fluid inlet port 20 of the fluid controller 16 while the outlet annular groove 82 is in fluid communication with the fluid outlet port 22.

The inner surface 76 of the valve housing 62 further defines first and second control annular grooves 84, 86 having openings at the valve bore 78. The first control annular groove 84 is disposed between the inlet annular groove 80 and the outlet annular groove 82 and is in fluid communication with the first control port 26. The second control annular groove 86 is disposed between the inlet annular groove 80 and the first control annular groove 84 and is in fluid communication with the second control port 28.

The fluid controller 16 includes a valve assembly 86 that is rotatably disposed in the valve bore 78 of the valve housing 62. The valve assembly 86 is adapted to provide selective fluid communication between the valve housing 62 and the fluid meter 66.

In the depicted embodiment, the valve assembly 86 includes a sleeve 88 and a spool 90. The sleeve 88 defines a central bore 92 in which the spool 90 is rotatably disposed. The spool 90 includes an input portion 94 having a reduced diameter and defining a plurality of internal splines which provide for a mechanical connection site between the spool 90 and an input device, such as a steering wheel.

The fluid meter 66 of the fluid controller 16 includes an internally toothed ring 96 and an externally toothed star 98. The star 98 defines a set of internal splines, and in splined engagement therewith is a set of external splines formed on a rearward end of a drive shaft 100. The drive shaft 100 has a bifurcated forward end permitting driving connections between the drive shaft 100 and the sleeve 88, by means of a pin 102 passing through a pair of openings in the spool 90 and a pair of openings in the sleeve 88. Thus, pressurized fluid flowing through the valve assembly 86 in response to rotation of the spool 90 flows through the fluid meter 66, causing orbital and rotational movement of the star 98 within the ring 96. Such movement of the star 98 causes the follow-up movement of the sleeve 88, by means of the drive shaft 98 and pin 102 to maintain a particular relative displacement between the spool 90 and the sleeve 88, proportional to the rate of rotation of the input device. A plurality of springs extends through an opening in the spool 90, biasing the sleeve 88 toward a neutral position N relative to the spool 90.

The toothed interaction of the star 98 orbiting and rotating within the ring 96 defines a plurality of expanding and contracting fluid volume chambers 104; adjacent each chamber 104, the port plate 64 defines a plurality of fluid ports 106. The valve housing 62 defines a plurality of axial bores 108, each of which is in open fluid communication with one of the fluid ports 106 of the port plate 64, and therefore, with one of the volume chambers 104. The valve housing 62 further defines radial bores 110, which provide fluid communication between each of the axial bores 108 and the valve bore 78.

Figure 3:
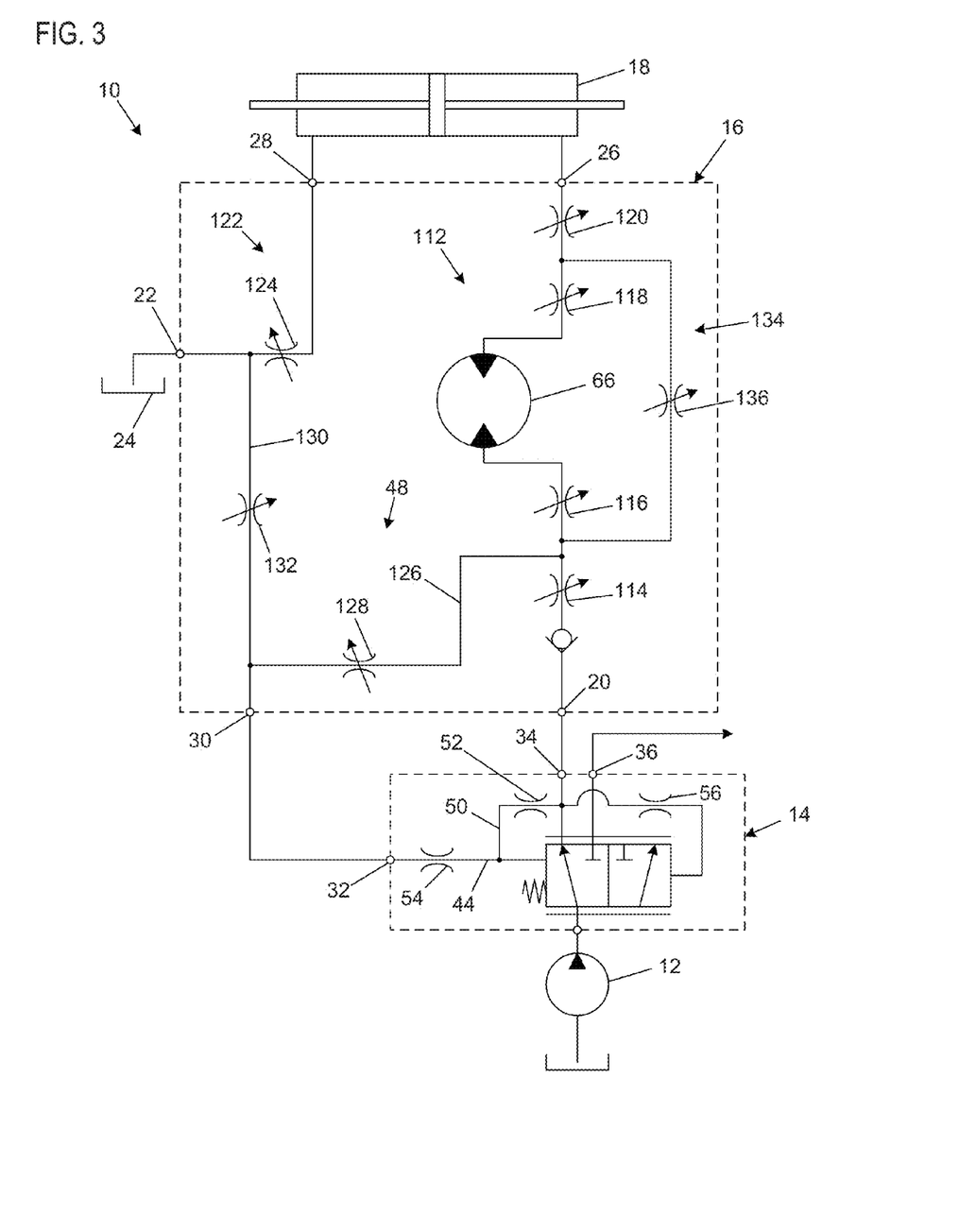
FIG. 3 is a flow diagram of the steering circuit of FIG. 1.

Referring now to FIGS. 1 and 3, the flow of fluid through the steering circuit 10 will be described. The fluid controller 16 of the steering circuit 10 defines a main flow path 112. The main flow path 112 is adapted to provide selective fluid communication between the inlet port 20 and the first control port 26. The main flow path 112 includes the fluid meter 66.

The main flow path 112 further includes a first variable orifice 114, a second variable orifice 116, a third variable orifice 118 and a fourth variable orifice 120. The first variable orifice 114 is disposed between the inlet port 20 and the fluid meter 66. The second variable orifice 116 is disposed between the first variable orifice 114 and the fluid meter 66. The third variable orifice 118 is disposed between the fluid meter 66 and the first control port 26. The fourth variable orifice 120 is disposed between the third variable orifice 118 and the first control port 26. When the fluid controller 16 is actuated to a right or left turn position, fluid flows from the inlet port 20 through the first and second variable orifices 114, 116 to the fluid meter 66. The fluid then exits the fluid meter 66 and flows to the first control port 26 through the third and fourth variable orifices 118, 120.

The fluid actuator 18 is actuated by fluid from the first control port 26 of the fluid controller 16. The fluid that is displaced by the fluid actuator 18 is returned to the reservoir 24 through a return flow path 122. The return flow path 122 provides fluid communication between the second control port 28 and the fluid reservoir 24. The return fluid path 122 includes a fifth variable orifice 124 through which returned fluid flows.

The main fluid path 112 is also in communication with the load sense port 30 through the load sense circuit 48. The load sense circuit 48 includes a load sense flow path 126 that provides fluid communication between the load sense port 30 and the main flow path 112 of the fluid controller 16. In the depicted embodiment, the load sense flow path 126 connects to the main flow path 112 downstream of the first variable orifice 114 and upstream of the second variable orifice 116. The load sense flow path 126 includes a variable load sense orifice 128, which will be described in greater detail subsequently.

When the fluid controller 16 is actuated to the right or left turn position, a portion of the fluid from the fluid pump 12 flows through the priority valve assembly 14, flow path 50 and load signal 44 of the load sense circuit 48 to the load sense port 30 of the fluid controller 16. If the variable load sense orifice 128 is open, the fluid travels through the load sense flow path 126 of the fluid controller 16 to the main flow path 112 of the fluid controller 16.

The load sense circuit 48 further includes a load sense drain path 130. The load sense drain path 130 provides fluid communication between the load sense port 30 and the return port 22. In the depicted embodiment, the load sense drain path 130 is disposed in parallel to the load sense flow path 126.

The load sense drain path 130 includes a variable load sense drain orifice 132. In the depicted embodiment, the load sense drain path 130 is connected to the return fluid path 122 downstream of the fifth variable orifice 124. When the variable load sense drain orifice 132 is open, fluid in the load sense circuit 48 flows to the reservoir 24 through the load sense drain path 130.

In the depicted embodiment, the steering circuit 10 includes an amplification flow path 134. The amplification flow path 134 is disposed in parallel with the main flow path 112 of the fluid controller 14. The amplification flow path 134 communicates with the main flow path 112 downstream of the first variable orifice 114 and upstream of the fourth variable orifice 120.

The amplification flow path 134 is adapted to provide an additional fluid path to the first control port 26 that bypasses the fluid meter 66. When the amplification flow path 134 is active, actuation of a steering input device (e.g., steering wheel, etc.) connected to the fluid controller 14 results in a greater amount of fluid being passed through the fluid controller 16 to the fluid actuator per rotation of the valve assembly 86 than when the amplification flow path 134 is not active.

In the depicted embodiment, the amplification flow path 134 includes a variable amplification orifice 136. When the variable amplification orifice 136 is open, a portion of the fluid entering the fluid controller 16 through the inlet port 20 enters the amplification flow path 134. The fluid in the amplification flow path 134 passes through the variable amplification orifice 136 and the fourth variable orifice 120 to the first control port 26.

Figure 4:
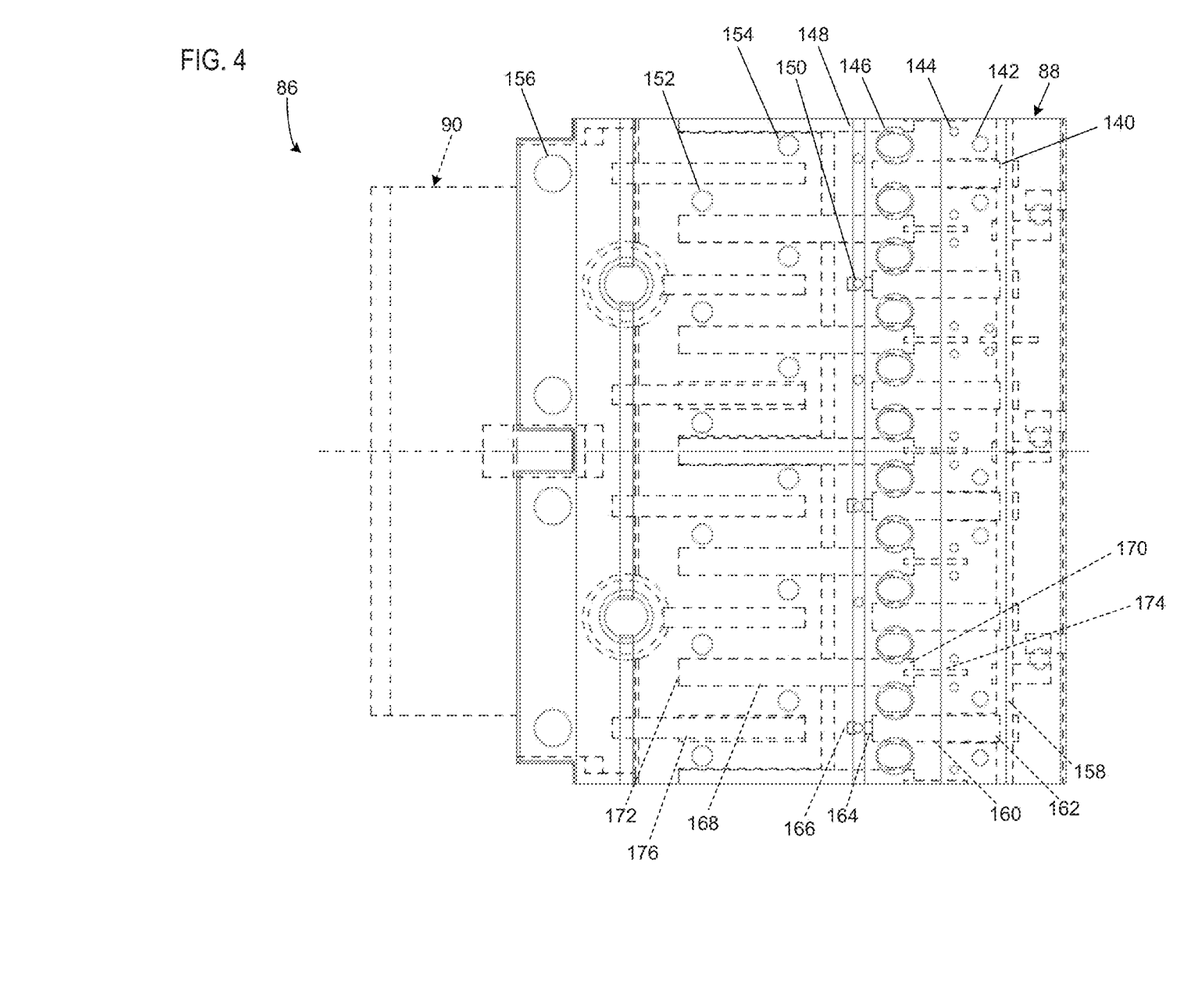
FIG. 4 is an overlay view of a valve assembly used in the fluid controller of FIG. 2 with the valve assembly shown in a neutral position.
Figure 5:
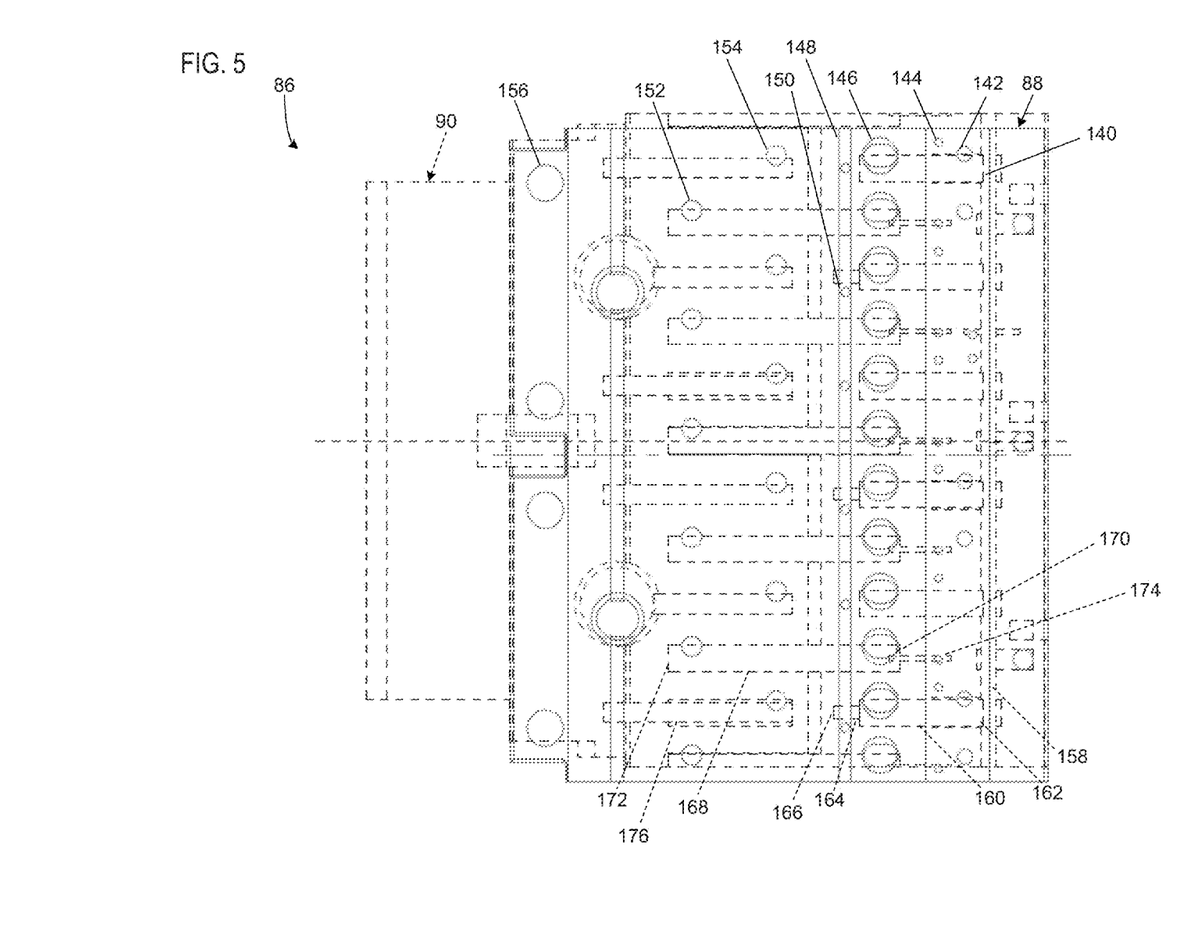
FIG. 5 is an overlay view of the valve assembly of FIG. 4 shown in position displaced from the neutral position.

Referring now to FIGS. 2, 4 and 5, the interface of the sleeve 88 and the spool 90 of the valve assembly 86 of the fluid controller 16 is shown. For ease of illustration and understanding, elements of the sleeve 88 are shown by solid lines and elements of the spool 90 are shown by dotted lines.

In FIG. 4, the valve assembly 86 is shown centered in a neutral position in which the spool 90 is not rotationally displaced relative to the sleeve 88. In FIG. 5, the valve assembly 86 is shown in a right or left turn position where the spool 90 is rotationally displaced relative to the sleeve 88.

The sleeve 88 defines an inlet circumferential groove 140 that is generally aligned with the inlet annular groove 80 of the valve housing 62 when the valve assembly 86 is disposed in the valve bore 78 of the valve housing 62. The sleeve 88 defines a plurality of supply ports 142 disposed in the inlet circumferential groove 140 that extends radially through the sleeve 88 to the central bore 92 of the sleeve 88.

The sleeve 88 further defines a plurality of amplification ports 144 disposed in the inlet circumferential groove 140. The plurality of amplification ports 144 extends radially through the sleeve 88 to the central bore 92 of the sleeve 88.

The sleeve 88 defines a plurality of metering ports 146. The metering ports 146 are disposed adjacent to the inlet circumferential groove 140. When the valve assembly 86 is disposed in the valve bore 78 of the valve housing 62, the metering ports 146 are generally aligned with the radial bores 110 of the valve housing 62.

Disposed adjacent to the metering ports 146, the sleeve 88 defines a load sense groove 148 that extends circumferentially about the sleeve 88. When the valve assembly 86 is disposed in the valve bore 78 of the valve housing 62, the load sense groove 148 is in fluid communication with the load sense port 30. The sleeve 88 defines a plurality of load sense passages 150 disposed in the load sense groove 148. The plurality of load sense passages 150 extends radially through the sleeve 88 to the central bore 92 of the sleeve 88.

The sleeve 88 defines pluralities of first and second control passages 152, 154 disposed adjacent to the load sense groove 148. The pluralities of first and second control passages 152, 154 extend radially through the sleeve 88 to the central bore 92 of the sleeve 88. When the valve assembly 86 is disposed in the valve bore 78 of the valve housing 62, the plurality of first control passages 152 are generally aligned with the first control annular groove 84 of the valve housing 62 while the plurality of second control passages 154 are generally aligned with the second control annular groove 86 of the valve housing 62.

The sleeve 88 defines a plurality of return ports 156 disposed adjacent to the plurality of first control passages 152. The plurality of return ports 156 extends radially through the sleeve 88 to the central bore 92 of the sleeve 88. When the valve assembly 86 is disposed in the valve bore 78 of the valve housing 62, the return ports 156 are generally aligned with the outlet annular groove 82 of the valve housing 62.

The spool 90 defines a circumferential groove 158 and a plurality of supply slots 160 that extend axially outward from the circumferential groove 158. The supply slots 160 include a first axial end 162 and a second axial end 164. The first axial end 162 is in fluid communication with the circumferential groove 158. When the spool 90 is disposed in the central bore 92 of the sleeve 88, the supply slots 160 are axially aligned with the supply ports 142 and the metering ports 146 so that the supply slots 160 of the spool 90 can selectively overlap the supply ports 142 and metering ports 146 of the sleeve 88 when the spool 90 is rotationally displaced relative to the sleeve 88 to provide selective fluid communication between the supply ports 142 and the metering ports 146. The selective overlap between the supply slots 160 of the spool 90 and the supply ports 142 create variable orifices that are collectively referred to as the first variable orifice 114 (shown in FIG. 3). The selective overlap between the supply slots 160 of the spool 90 and the metering ports 146 of the sleeve 88 creates variable orifices that are collectively referred to as the second variable orifice 116 (shown in FIG. 3).

A portion of the plurality of supply slots 160 include load sense slots 166 that extend axially outwardly from second axial ends 164 of the supply slots 160. In the depicted embodiment, a width of the load sense slot 166 is less than a width of the supply slot 160. When the spool 90 is disposed in the central bore 92 of the sleeve 88, the load sense slots 166 are axially aligned with the load sense passages 150 of the sleeve 88 so that the load sense slots 166 of the spool 90 can selectively overlap the load sense passages 150 of the sleeve 88 when the spool 90 is rotationally displaced relative to the sleeve 88 to provide selective fluid communication between the load sense passages 150 and the supply slots 160. The selective overlap between the load sense slots 166 of the spool 90 and the load sense passages 150 of the sleeve 88 creates variable orifices that are collectively referred to as the variable load sense orifice 128 (shown in FIGS. 1 and 3).

The spool 90 defines a plurality of control slots 168. The control slots 168 extend in an axial direction from the metering ports 146 in the sleeve 88 to the first and second control passages 152, 154 in the sleeve 88 when the spool 90 is disposed in the central bore 92 of the sleeve 88. The control slots are adapted to provide selective fluid communication between the metering ports 146 and the first and second control passages 152, 154 of the sleeve 88. The selective overlap between the control slots 168 of the spool 90 and the metering ports 146 create variable orifices that are collectively referred to as the third variable orifice 118 (shown in FIG. 3). The selective overlap between the control slots 168 of the spool 90 and one of the first control passages 152 and the second control passages 154 of the sleeve 88 creates variable orifices that are collectively referred to as the fourth variable orifice 120 (shown in FIG. 3).

The control slots 168 include a first axial end 170 and a second axial end 172. Each of the control slots 168 includes an amplification slot 174 that extends axially from the first axial end 170 of the control slot 168 toward the amplification ports 144 of the sleeve 88 when the spool 90 is disposed in the central bore 92 of the sleeve 88. The amplification slot 174 is adapted to provide selective fluid communication between the amplification ports 144 and the first or second control passages 152, 154. The selective overlap between the amplification slots 174 of the spool 90 and the amplification ports 144 of the sleeve 88 creates variable orifices that are collectively referred to as the variable amplification orifice 136 (shown in FIG. 3).

The spool 90 defines a plurality of return slots 176. The return slots 176 are adapted to provide selective fluid communication between the first and second control passages 152, 154 and the outlet annular groove 82 in the valve housing 62. In the depicted embodiment, the return slots 176 are generally aligned but axially offset from the supply slots 160. The selective overlap between the return slots 176 of the spool 90 and the first and second control passages 152, 154 of the sleeve 88 creates variable orifices that are collectively referred to as the fifth variable orifice 124 (shown in FIG. 3).

Figure 6:
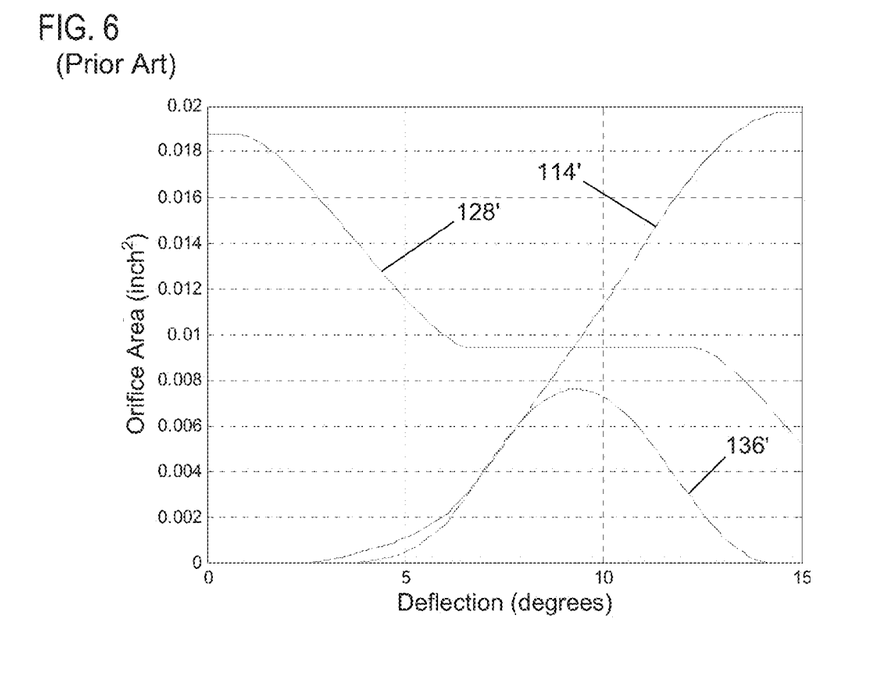
FIG. 6 is a graph showing deflection versus orifice area for a prior art steering unit.

Referring now to FIG. 6, a graph of orifice area versus degrees of rotational deflection of a spool relative to a sleeve of a prior art steering unit is shown. This graph shows the orifice areas for a first variable orifice 114' (an overlap area between a metering port of a prior art sleeve and a supply slot of a prior art spool per degree of rotation of the prior art spool relative to the prior art sleeve), a variable load sense orifice 128' (an overlap area between a load sense passage of a prior art sleeve and a supply slot of a prior art spool per degree of rotation of the prior art spool relative to the prior art sleeve), and a variable amplification orifice 136' (an overlap area between an amplification port of a prior art sleeve and a control slot in a prior art spool per degree of rotation of the prior art spool relative to the prior art sleeve). In the prior art steering unit, the maximum rotational deflection of the spool relative to the sleeve is fifteen degrees.

In the spool and sleeve assembly of the prior art steering unit, the variable load sense orifice 128' remains open through maximum rotational deflection of the spool relative to the sleeve. As shown in the graph, the orifice area of the variable load sense orifice 128' of the prior art steering unit decreases from 100% at 0 degrees of deflection to about 25% at maximum rotational deflection (about 15 degrees).

The variable amplification orifice 136' of the prior art steering unit opens and closes as the spool is deflected to the maximum rotational deflection angle relative to the sleeve. In the graph of FIG. 6, the variable amplification orifice 136' of the prior art steering unit opens around 4 degrees of deflection and closes around 14 degrees.

Figure 7:
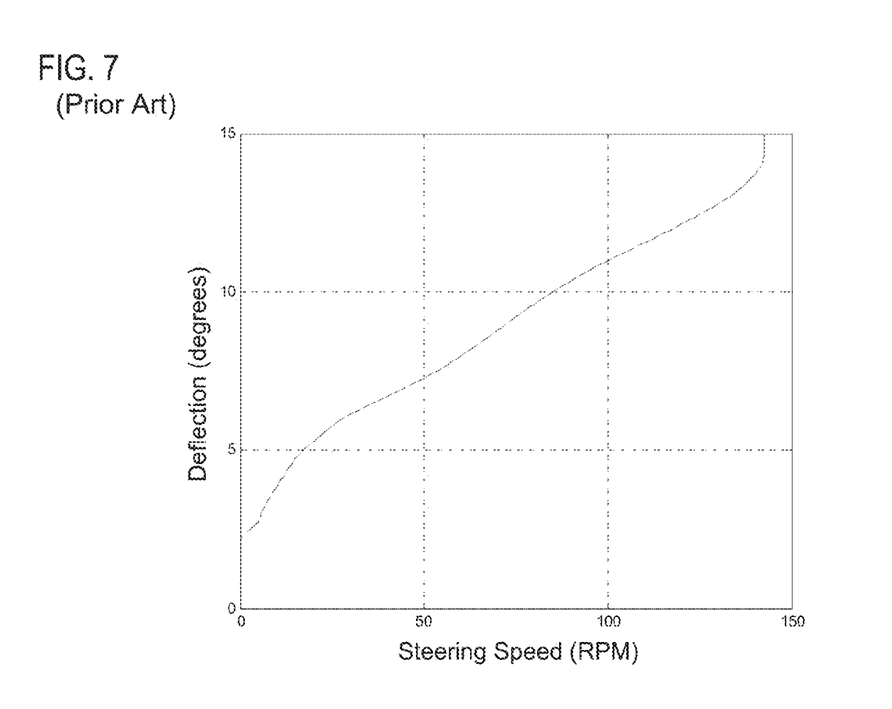
FIG. 7 is a graph showing steering speed versus deflection for a prior art steering unit.

Referring now to FIG. 7, a graph of steering speed versus deflection of the spool relative to the sleeve of the prior art steering unit is shown. As shown, as steering speed increases, the amount of deflection between the spool and sleeve of the prior art steering unit also increases. In the prior art steering unit, the steering speed versus deflection curve is generally linear. The prior art spool and sleeve reach maximum rotational deflection when the steering speed is greater than 140 rpm.

Figure 8:
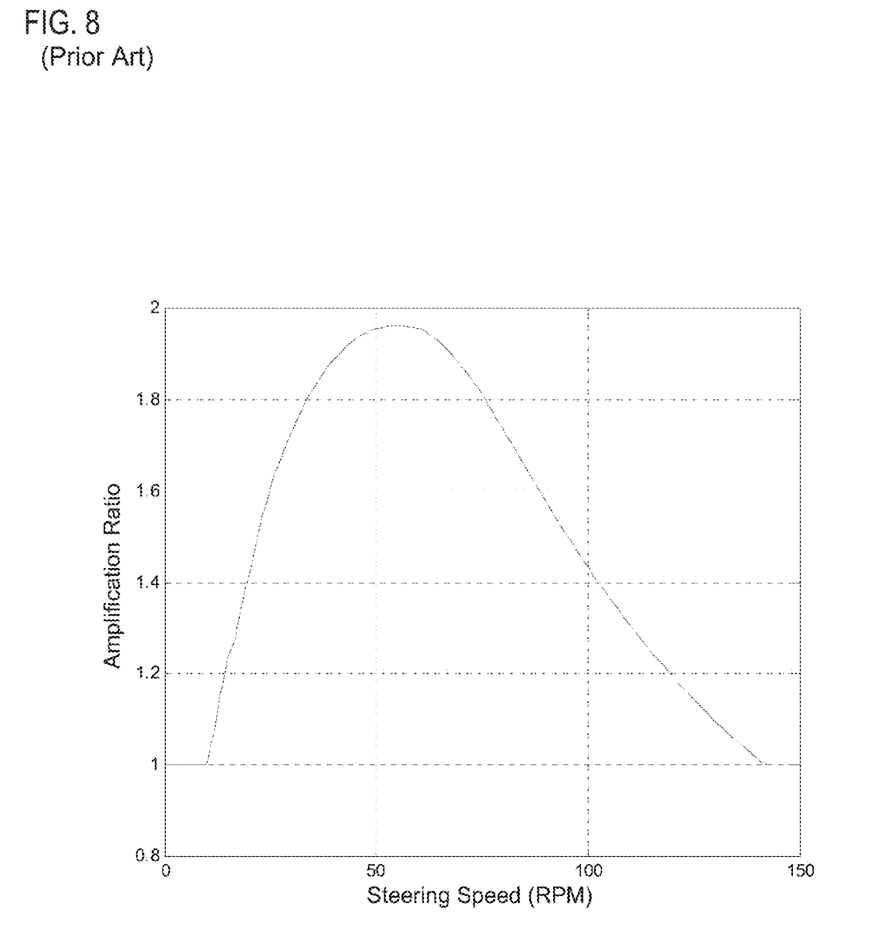
FIG. 8 is a graph showing steering speed versus amplification ratio for a prior art steering unit.

Referring now to FIG. 8, a graph of the amplification ratio versus steering speed for the prior art steering unit is shown. The amplification ratio is calculated by adding the flow through the main flow path to the flow through the amplification flow path and dividing that amount by the flow through the main flow path. As shown in the graph of FIG. 8, the maximum amplification ratio of the prior art steering unit is provided when the steering speed is between about 45 rpm and 65 rpm. As shown in FIG. 8, the amplification ratio decreases as the steering speed increases beyond about 60 rpm.

As shown in FIG. 7, the spool and sleeve deflection angle is between about 7 and 9 degrees at a steering speed of between about 45 and 65 rpm. As shown in FIG. 6, the orifice area of the variable amplification orifice 128' is approaching its maximum size when the spool and sleeve deflection is between about 7 and 9 degrees. After about 8 to 9 degrees of deflection, the orifice area of the variable amplification orifice 128' of the prior art steering unit begins to decrease, which affects the amplification ratio shown in FIG. 8.

Figure 9:
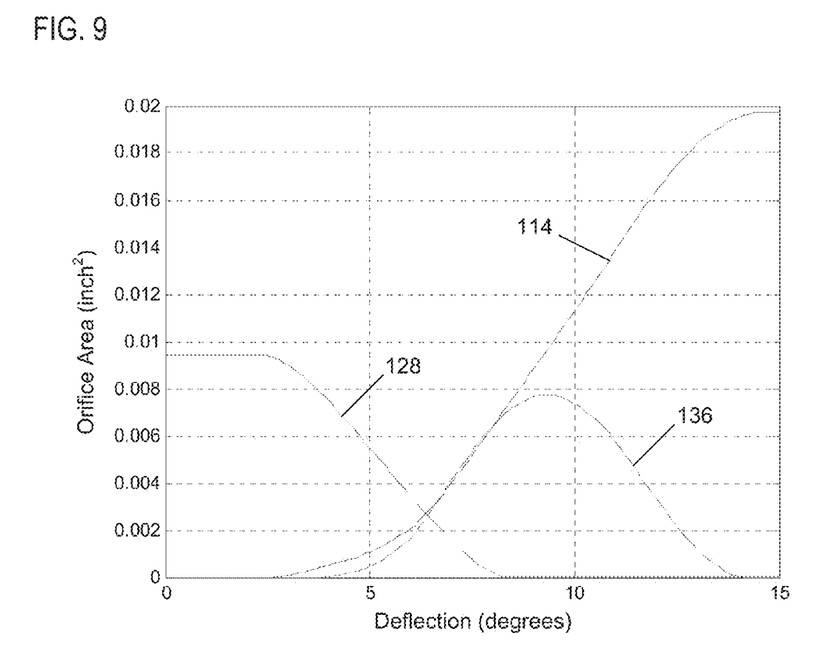
FIG. 9 is a graph showing deflection versus orifice area for the fluid controller of the present disclosure.

Referring now to FIG. 9, a graph of orifice area versus degrees of rotational deflection of the spool 90 relative to the sleeve 88 of the fluid controller 16 is shown. This graph shows the orifice areas for the first variable orifice 114, the variable load sense orifice 128, and the variable amplification orifice 136. In the depicted embodiment, the maximum rotational deflection of the spool 90 relative to the sleeve 88 is about fifteen degrees.

As shown in FIG. 9, the variable load sense orifice 128 substantially closes prior to maximum rotational deflection of the spool 90 relative to the sleeve 88. It will be understood that the term "substantially closed" refers to a condition in which the variable load sense orifice 128 has an area that is less than 10% of its maximum area. In the depicted embodiment, the variable load sense orifice 128 substantially closes at a deflection of the spool 90 relative to the sleeve 88 that is less than about 75% of the maximum rotational deflection of the spool 90 relative to the sleeve 88. In the depicted embodiment, the variable load sense orifice 128 substantially closes at a deflection of the spool 90 relative to the sleeve 88 that is less than about 66% of the maximum rotational deflection of the spool 90 relative to the sleeve 88. In the depicted embodiment, the variable load sense orifice 128 substantially closes at a deflection of the spool 90 relative to the sleeve 88 that is in the range of about 45% to about 60% of the maximum rotational deflection of the spool 90 relative to the sleeve 88. In the depicted embodiment, the variable load sense orifice 128 substantially closes at a deflection of the spool 90 relative to the sleeve 88 that is less than about 10 degrees. In the depicted embodiment, the variable load sense orifice 128 substantially closes at a deflection of the spool 90 relative to the sleeve 88 that is between about 5 to 10 degrees. In the depicted embodiment, the variable load sense orifice 128 substantially closes prior to the deflection of the spool 90 relative to the sleeve 88 at which the orifice area of the variable amplification orifice 136 is at its maximum.

In another embodiment, the orifice area of the variable load sense orifice 128 is reduced during deflection of the spool 90 relative to the sleeve 88 to an amount that is less than the orifice area of the load sense orifice 54 of the priority valve assembly 14. In another embodiment, the orifice area of the variable load sense orifice 128 is reduced during deflection of the spool 90 relative to the sleeve 88 to an amount that is less than or equal to about 70% of the orifice area of the load sense orifice 54 of the priority valve assembly 14. In another embodiment, the orifice area of the variable load sense orifice 128 is reduced during deflection of the spool 90 relative to the sleeve 88 to an amount that is less than or equal to about 50% of the orifice area of the load sense orifice 54 of the priority valve assembly 14. In another embodiment, the orifice area of the variable load sense orifice 128 is reduced during deflection of the spool 90 relative to the sleeve 88 to an amount that is less than or equal to about 25% of the orifice area of the load sense orifice 54 of the priority valve assembly 14.

The variable amplification orifice 136 opens and closes as the spool is deflected to the maximum rotational deflection angle relative to the sleeve. In the depicted embodiment, the variable amplification orifice 136 opens when the deflection of the spool 90 relative to the sleeve 88 is less than about 5 degrees and closes prior to the maximum rotational deflection of the spool 90 relative to the sleeve 88. In the depicted embodiment, the variable amplification orifice 136 closes when the deflection of the spool 90 relative to the sleeve 88 is between about 12 to about 15 degrees. In the depicted embodiment, the variable amplification orifice 136 closes when the deflection of the spool 90 relative to the sleeve 88 is between about 13.5 to about 14.5 degrees.

Figure 10:
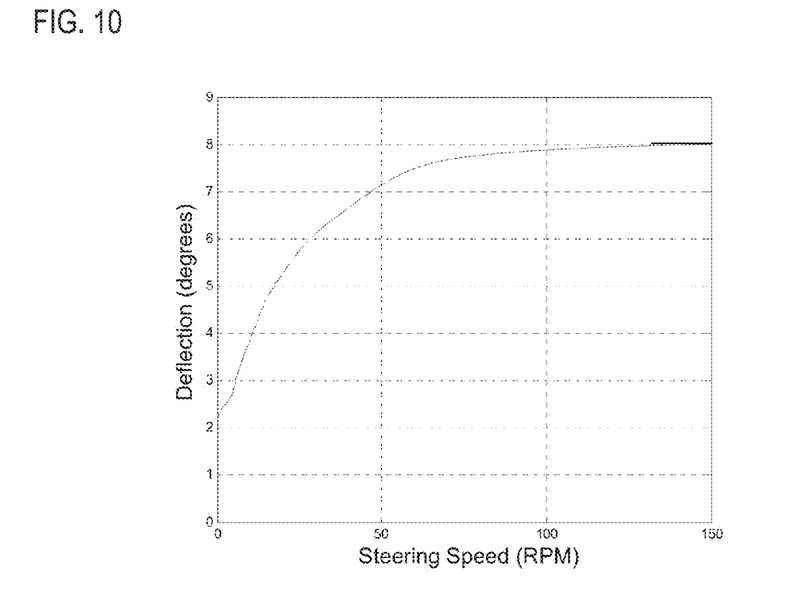
FIG. 10 is a graph showing steering speed versus deflection for the fluid controller of the present disclosure.

Referring now to FIG. 10, a graph of steering speed versus deflection of the spool 90 relative to the sleeve 88 is shown. Unlike the prior art steering unit, the steering speed versus deflection curve shown in FIG. 10 is non-linear. As steering speed increases from 0 rpm to about 150 rpm, the amount of deflection between the spool 90 and sleeve 88 increases to an amount less than the maximum rotational deflection. In the depicted embodiment, the amount of deflection of the spool 90 relative to the sleeve 88 is in a range of about 40% to about 70% of the maximum rotational deflection. In the depicted embodiment, the amount of deflection of the spool 90 relative to the sleeve 88 is in a range of about 40% to about 60% of the maximum rotational deflection. In the depicted embodiment, the amount of deflection of the spool 90 relative to the sleeve 88 is in a range of about 50% to about 60% of the maximum rotational deflection. In the depicted embodiment, the amount of deflection of the spool 90 relative to the sleeve 88 is in a range of about 50% to about 55% of the maximum rotational deflection.

Figure 11:
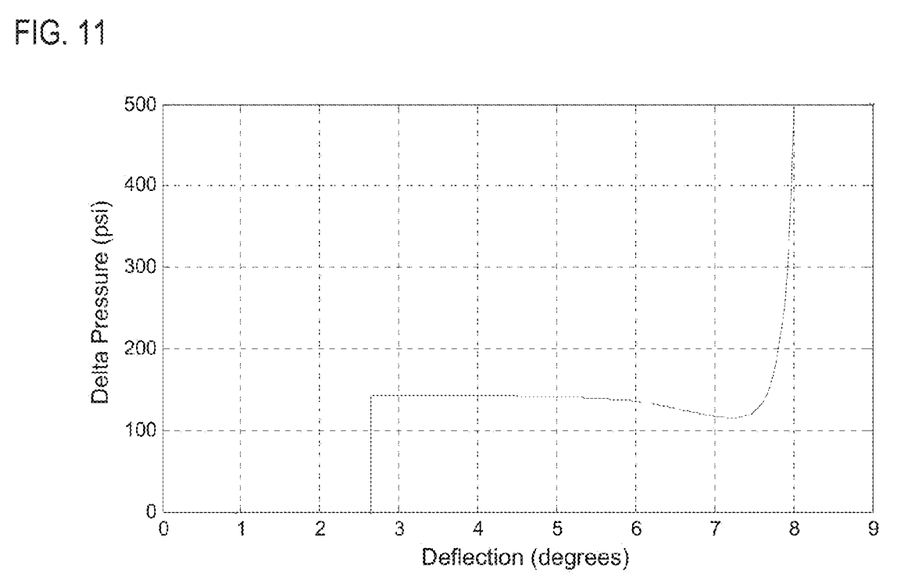
FIG. 11 is a graph showing deflection versus delta pressure for the fluid controller of the present disclosure.

When the variable load sense orifice 128 substantially closes, the fluid pressure at the inlet port 20 of the fluid controller 16 increases which results in the delta pressure across the first variable orifice 114 to increase as shown in FIG. 11. Therefore, as steering speed increases beyond the point at which the variable load sense orifice 128 has substantially closed, more fluid can flow through the valve assembly 86 without significantly increasing the amount of deflection of the spool 90 relative to the sleeve 88.

Figure 12:
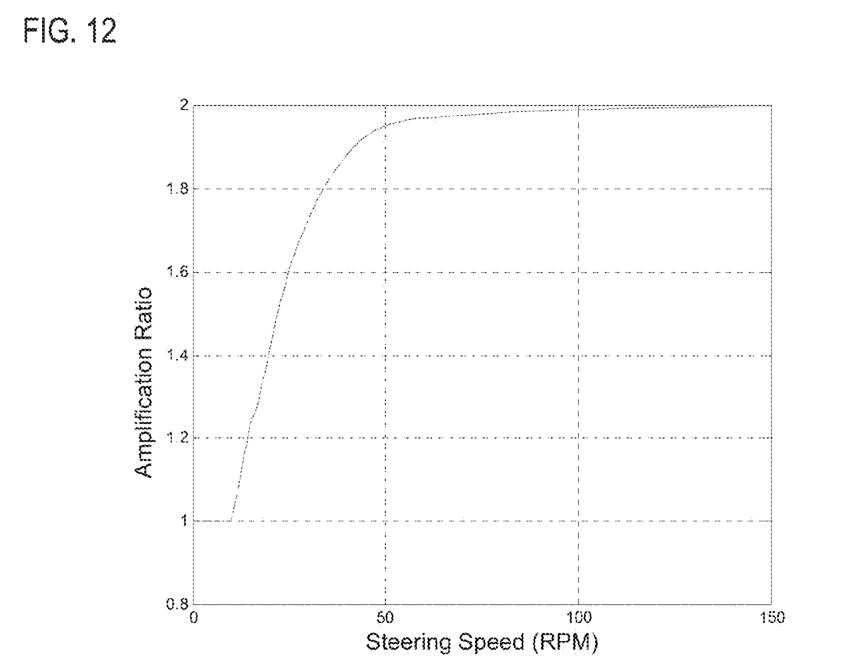
FIG. 12 is a graph showing steering speed versus amplification ratio for the fluid controller of the present disclosure.

Referring now to FIG. 12, the increase in delta pressure across the first variable orifice 114 of the valve assembly 86 due to the closing of the variable load sense orifice 128 allows the deflection of the spool 90 relative to the sleeve 88 to remain near the point at which the variable amplification orifice area is at its maximum for steering rates between about 50 rpm and about 150 rpm. This allows for more responsive steering at higher steering speeds.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A fluid controller comprising:
   a valve housing defining an inlet port, a return port, first and second control ports and a load sense port;
   a fluid meter in selective fluid communication with the valve housing;
   a valve assembly adapted to provide selective fluid communication between the valve housing and the fluid meter, the valve assembly including:
      a main flow path adapted to provide selective fluid communication between the inlet port and the first control port, wherein fluid in the main flow path passes through the fluid meter;
      a load sense flow path adapted to provide selective fluid communication between the load sense port and the main flow path, the load sense flow path including a variable load sense orifice, wherein when the variable load sense orifice is open, fluid travels through the load sense path to the main flow path, the variable load sense orifice being configured to substantially close when the deflection of the valve assembly is in the range of 5 to 10 degrees.

2. The fluid controller of claim 1, wherein the valve assembly further includes an amplification flow path in parallel to the main flow path, the amplification flow path being adapted to provide selective fluid communication between the inlet port and the first control port, wherein the amplification flow path bypasses the fluid meter.

3. The fluid controller of claim 2, wherein the amplification flow path includes a variable amplification orifice.

4. The fluid controller of claim 3, wherein variable load sense orifice substantially closes prior to a deflection of the valve assembly at which an orifice area of the variable amplification orifice is at its maximum.

5. The fluid controller of claim 1, wherein the valve assembly includes a sleeve defining a central bore and a spool rotatably disposed in the central bore of the sleeve.

6. The fluid controller of claim 5, wherein the sleeve and spool cooperatively define the variable load sense orifice.

7. A steering circuit comprising:
a fluid pump;
a priority valve assembly in fluid communication with the fluid pump;
a fluid actuator in selective fluid communication with the fluid pump;
a fluid controller in fluid communication with the fluid actuator and the priority valve, the fluid controller having a valve assembly including:
   a main flow path adapted to provide selective fluid communication between the fluid pump and the fluid actuator;
   a return flow path adapted to provide selective fluid communication between the fluid actuator and a reservoir;
   an amplification flow path in parallel to the main flow path, the amplification flow path adapted to provide selective fluid communication between the fluid pump and the fluid actuator;
   a load sense flow path adapted to provide selective fluid communication between the priority valve assembly and the main flow path, the load sense flow path including a variable load sense orifice;
   a load sense drain path adapted to provide selective fluid communication between the load sense flow path and the reservoir, the load sense drain path including a variable load sense drain orifice;
   wherein when the variable load sense orifice is open, fluid travels through the load sense path to the main flow path, the variable load sense orifice being configured to substantially close when the deflection of the valve assembly is in the range of 5 to 10 degrees.

8. The steering circuit of claim 7, wherein the amplification flow path includes a variable amplification orifice.

9. The steering circuit of claim 8, wherein variable load sense orifice substantially closes prior to a deflection of the valve assembly at which an orifice area of the variable amplification orifice is at its maximum.

10. A steering circuit comprising:
a priority valve assembly including a load sense orifice;
a fluid controller in fluid communication with the priority valve assembly, the fluid controller including:
   a valve housing defining an inlet port, a return port, first and second control ports and a load sense port;
   a fluid meter in selective fluid communication with the valve housing;
   a valve assembly adapted to provide selective fluid communication between the valve housing and the fluid meter, the valve assembly including:
      a main flow path adapted to provide selective fluid communication between the inlet port and the first control port, the main flow path including a first variable orifice disposed between the inlet port and the fluid meter, a second variable orifice, a third variable orifice and a fourth variable orifice, the second variable orifice being disposed between the first variable orifice and the fluid meter, the third variable orifice being between the fluid meter and the first control port, the fourth variable orifice being between the third variable orifice and the first control port;
      a return flow path adapted to provide selective fluid communication between the second control port and the return port, the return flow path including a fifth variable orifice;
      a load sense drain path adapted to provide selective fluid communication between the load sense port and the return port, the load sense drain path including a variable load sense drain orifice;
      a load sense flow path adapted to provide selective fluid communication between the load sense port and the main flow path, the load sense flow path including a variable load sense orifice having a variable orifice area that reduces during deflection of the valve assembly so that a fluid pressure across the first variable orifice increases, wherein the variable load sense orifice substantially closes at a deflection of the valve assembly that is in the range of 45% to 60% of the maximum rotational deflection of the valve assembly.

11. The steering circuit of claim 10, wherein the valve assembly further includes an amplification flow path in parallel to the main flow path, the amplification flow path being adapted to provide selective fluid communication between the inlet port and the first control port, wherein the amplification flow path includes a variable amplification orifice.

12. The steering circuit of claim 11, wherein the variable amplification orifice closes when the deflection of the valve assembly is between 12 to 15 degrees.

13. The steering circuit of claim 11, wherein the variable amplification orifice opens when the deflection of the valve assembly is less than 5 degrees.

14. The steering circuit of claim 13, wherein the variable amplification orifice closes prior to the maximum rotational deflection of the valve assembly.

* * * * *